(No Model.)
P. J. DOCKRAY.
CAR COUPLING.
No. 515,487. Patented Feb. 27, 1894.
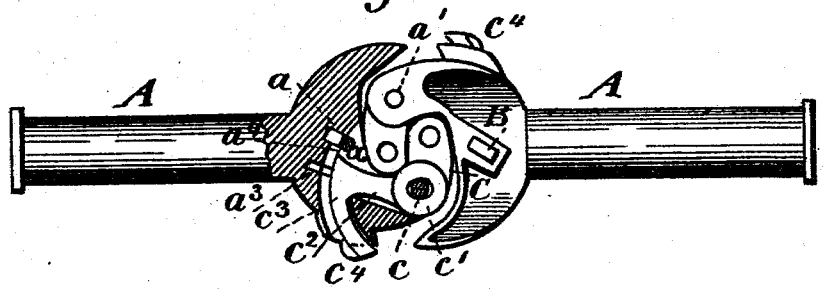
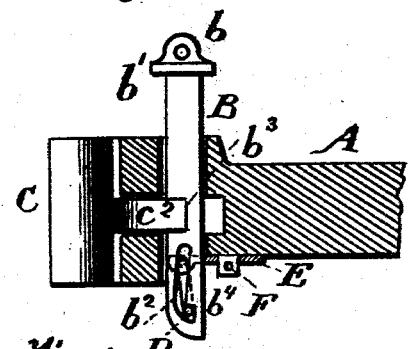
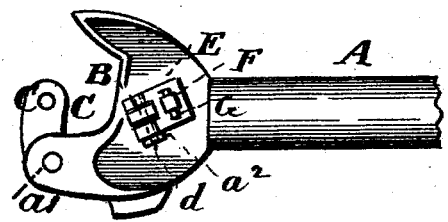
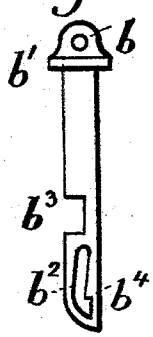
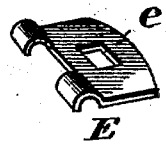
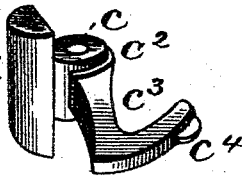
Witnesses.
A. Ruppert
Geo. Bates
Inventor:
Peter J. Dockray,
Per
Thomas P. Simpson
Atty

UNITED STATES PATENT OFFICE.

PETER J. DOCKRAY, OF KEARNEY, NEW JERSEY.

CAR-COUPLING.

SPECIFICATION forming part of Letters Patent No. 515,487, dated February 27, 1894.

Application filed August 14, 1893. Serial No. 483,089. (No model.)

*To all whom it may concern:*

Be it known that I, PETER J. DOCKRAY, a citizen of the United States, residing at Kearney, in the county of Hudson and State of New Jersey, have invented certain new and useful Improvements in Car-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make some improvements upon what is generally known as the M. C. B. or master car-builders' coupling.

Figure 1 of the drawings is a plan view of two drawheads coupled together; Fig. 2 a vertical section on the dotted line $x\ x$ of Fig. 1; Fig. 3 a bottom plan view, and Figs. 4, 5, 6, and 7, detail views respectively of the pin, the crank shaft, the bearing plate and the clutch.

In the drawings, A represents the drawhead which is preferably cast in one piece and provided with the vertical pin hole $a'$ set in a position to take the strain, in pulling, off pivot pin. This hole, as well as the pin, is oblong in form so that the pin B may not turn therein.

C is the clutch having a vertical oval hole $c$ through which passes a pivot $c'$ that also passes through the upper and lower round holes $a'\ a'$ of the drawhead. The clutch may however have a round and the drawhead oval holes. The clutch has also an arc-arm $c^3$ on a radial shank $c^2$ and provided with a cam $c^4$ on the end of its convex face. The clutch turns in the usual manner on its pivot and is locked by dropping the pin in front of the arc-arm.

On the inside of the drawhead, is formed a shoulder $a^4$ which engages the cam $c^4$, to take the strain in pushing off pivot-pin, the oval hole allowing this. The weight of the drop-pin on the arc-arm prevents the clutch from turning outwardly too far and holds it just where it will be struck by the entering clutch of another drawhead.

The pin B has, at the top, a hole $b$ to receive two chains, one from the top of the car and another from a cross-rod with handles on each side of the car. Just below the hole $b$ is a flange $b'$ to prevent the pin from passing too far downward, and near the middle a notch or open slot $b^3$ through which passes the arc-arm $c^3$ on its inward and outward movement. The pin has also a slot $b^2$ with a shoulder $b^4$ on the inside of the slot, and in this slot $b^2$ is arranged the crank shaft D which turns in bearings on the plate E. This shaft has an arm $d$ which passes through the drawhead slot $a^2$ and is operated by the cam $c^4$ on the arc-arm. The crank shaft engages the shoulder $b^4$ to hold the pin up and allow the clutch C to open.

The bearing-plate E has a square hole $e$ into which fits the rigid stud F on the drawhead and is held down by the cross-pin G.

The master car builders' coupling is liable to have its pivot-pin broken at the pivot-holes, which objection I have overcome by the oval hole in clutch. When the clutch is locked, it is just as firm without the pin as with it, inasmuch as the stud or cam $c^4$ bears against the drawhead shoulder $a^4$ while the back of shank rests against the inner wall of the drawhead, thus taking the push-strain effectually. The strain in pulling is taken off because the back of clutch-shank bears against the inner wall of the drawhead while the front thereof bears against the pin and the arc-arm against the inner wall of the horizontal hole, the oval hole in the clutch permitting this, thus allowing smaller pivot pins and holes so as to increase the strength of the clutch at its weakest point. The long arm $d$ of the crank-shaft which projects into the drawhead slot $a^2$ and is acted upon by the arc-cam $c^4$, renders unnecessary any weighted lever and, being under the drawhead is out of the way of everything, including ice and snow. When the clutch is open wide, the crank-shaft drops the lock pin B on the arc-arm C so as to hold it open.

What I claim as new, and desire to protect by Letters Patent, is—

1. A clutch C having an oval hole for the pivot pin and a cam $c^4$ on the end of its convex arc-face in combination with a drawhead having the shoulder $a^4$ for the purpose set forth.

2. The lock-pin B having a longitudinal slot $b^2$ and a shoulder $b^4$ on the inside of the slot, in combination with the crank-shaft D adapted to engage said shoulder as and for the purpose set forth.

3. The combination with the crank-shaft D, of the plate E having the bearings therefor, and the square hole $e$, the fixed stud F on the drawhead and the crosspin G, for the purpose set forth.

4. The clutch C having the cam $c^4$ on its arc-arm, the drawhead having the slot $a$ and the crank shaft D having an arm $d$ projecting through said slot as and for the purpose specified.

In testimony whereof I affix my signature in presence of two witnesses.

PETER J. DOCKRAY.

Witnesses:
GEO. H. GREASON,
WILBUR F. SMITH.